(12) United States Patent
Chang

(10) Patent No.: US 6,388,236 B1
(45) Date of Patent: May 14, 2002

(54) SPRING MOUNTED BAYONET PROBE FOR AN ELECTRIC FRYER

(75) Inventor: Li-Chen Chang, Pa-Te (TW)

(73) Assignee: Lyu Jan Co., Ltd., Taoyuan Hsien (TW)

( * ) Notice: Subject to any disclaimer, the term of this patent is extended or adjusted under 35 U.S.C. 154(b) by 0 days.

(21) Appl. No.: 09/917,936

(22) Filed: Jul. 31, 2001

(51) Int. Cl.[7] .................................................. A47J 37/12
(52) U.S. Cl. ......................... 219/435; 219/430; 219/432
(58) Field of Search ................................. 219/435, 429, 219/430, 432; 99/403, 325, 331

(56) References Cited

U.S. PATENT DOCUMENTS

| | | | | |
|---|---|---|---|---|
| 4,307,287 A | * | 12/1981 | Weiss | 219/432 |
| 4,458,139 A | * | 7/1984 | McClean | 219/432 |
| 5,228,381 A | * | 7/1993 | Virgillio et al. | 219/429 |
| 5,750,963 A | * | 5/1998 | Christensen et al. | 219/497 |
| 6,225,605 B1 | * | 5/2001 | Beugnot et al. | 219/432 |

FOREIGN PATENT DOCUMENTS

| | | |
|---|---|---|
| DE | 19714038 | * 10/1998 |
| DE | 200-05-462 | 5/2000 |
| EP | 632988 | * 11/1995 |

* cited by examiner

Primary Examiner—Joseph Pelham
(74) Attorney, Agent, or Firm—Bacon & Thomas, PLLC

(57) ABSTRACT

A temperature control device for an electric pot assembly includes a base for receiving a pot therein and a receptacle is connected to the base. A temperature probe 41 includes a bi-metal plate and an end of the temperature probe is connected to a U-shaped resilient member on an outside of the base and the other end of the temperature probe extends through a peripheral wall of the base. A temperature sensing member is connected to the temperature probe and has two overlapped plates. An end of the bi-metal plate contacts one of the plates. The pot has an electric wire and a frame connected to a bottom thereof. The temperature probe is engaged the frame when the pot 1 is put on the base. The two plates are separated to open the circuit when the electric wire is overheated.

3 Claims, 5 Drawing Sheets

SPRING MOUNTED BAYONET PROBE FOR AN ELECTRIC FRYER

FIELD OF THE INVENTION

The present invention relates to a temperature control device having a temperature probe with bi-metal switch and the probe is connected to a resilient member. The probe is pressed into the frame by the frying pan and is removed from the base when no frying pan is on.

BACKGROUND OF THE INVENTION

A conventional electric stove employs electricity to generate heat on a metal plate and the pots or pans are put on the metal plate and heated to cook food. Each metal plate has a control knob which controls temperature of the metal plate and the heat is transferred to the food in the pots or pans. However, the temperature shown on the control knob is not precise and the metal plate continuously increases the temperature if the electric power supply is kept at "ON" position. When frying food in a frying pan, the temperature should be controlled within a certain range so as to obtain good fried food. The conventional electric stove has only simplest temperature control device, the users have to control the control knob by experiences and when the highest temperature reaches, the users then turn the knob down so as to avoid burn the food. Such experiences perhaps are built on countless failures.

SUMMARY OF THE INVENTION

In accordance with one aspect of the present invention, there is provided an electric pot assembly which comprises a base having a receptacle connected thereto and a pot is put on the base and is electrically engaged with the receptacle with terminals of an electric wire. A temperature probe is connected to a resilient member connected to an outside of the base and comprises a bi-metal plate received therein. The temperature probe has an end connected to the resilient member and the other end of the temperature probe extends through a hole defined in a peripheral wall of the base. A temperature sensing member is connected to the temperature probe and has a first plate and a second plate. The first plate is located above and contacts the second plate. An end of the bi-metal plate contacts the second plate. A frame is connected to the bottom of the pot an d has a recess in which the temperature probe is engaged when the pot is put on the base.

The primary object of the present invention is to provide an electric pot assembly that has a temperature control device to open the circuit when a pre-determined temperature is reached.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
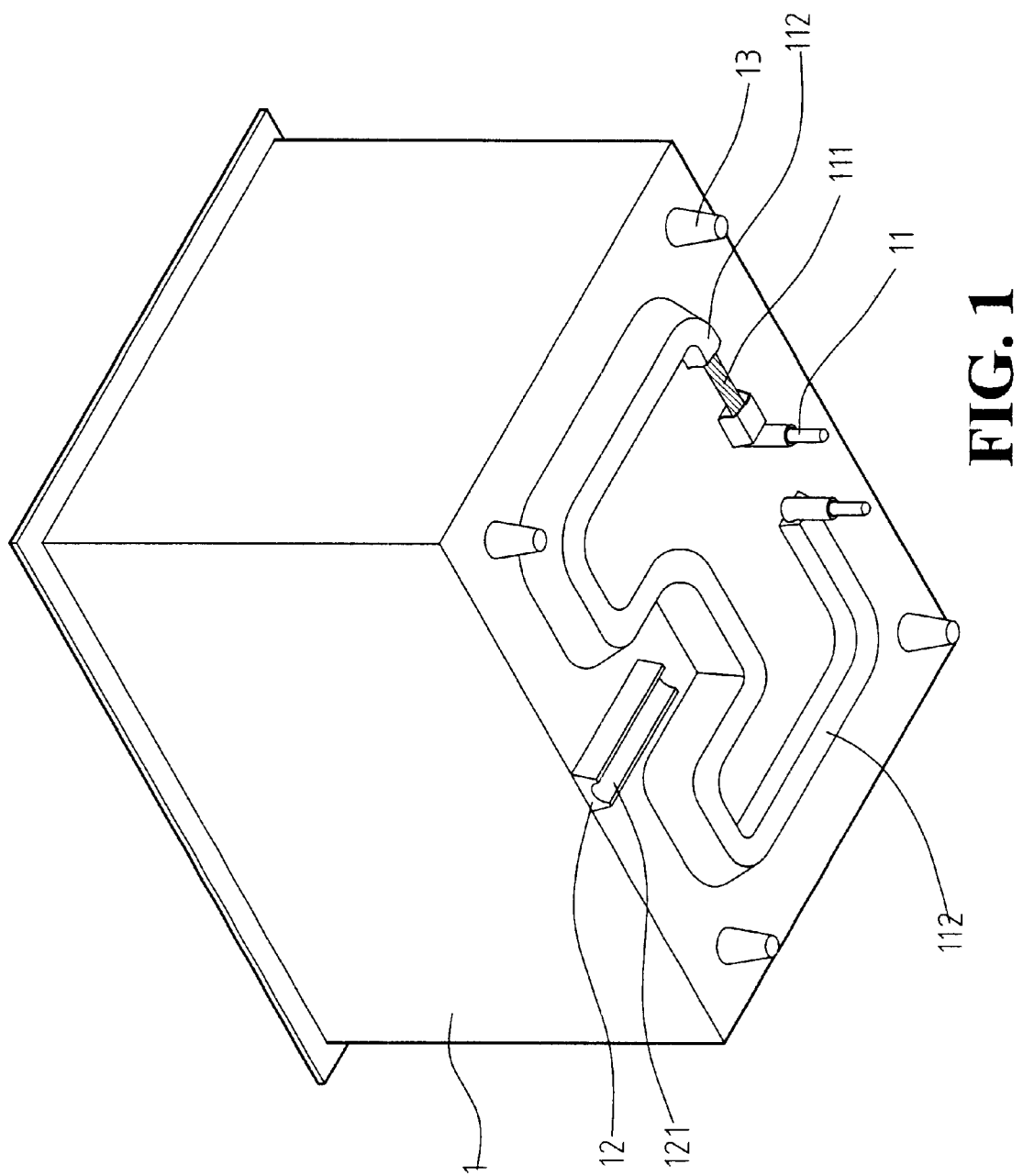
FIG. 1 is a perspective view to show the pot of the pot assembly of the present invention.
Figure 2:
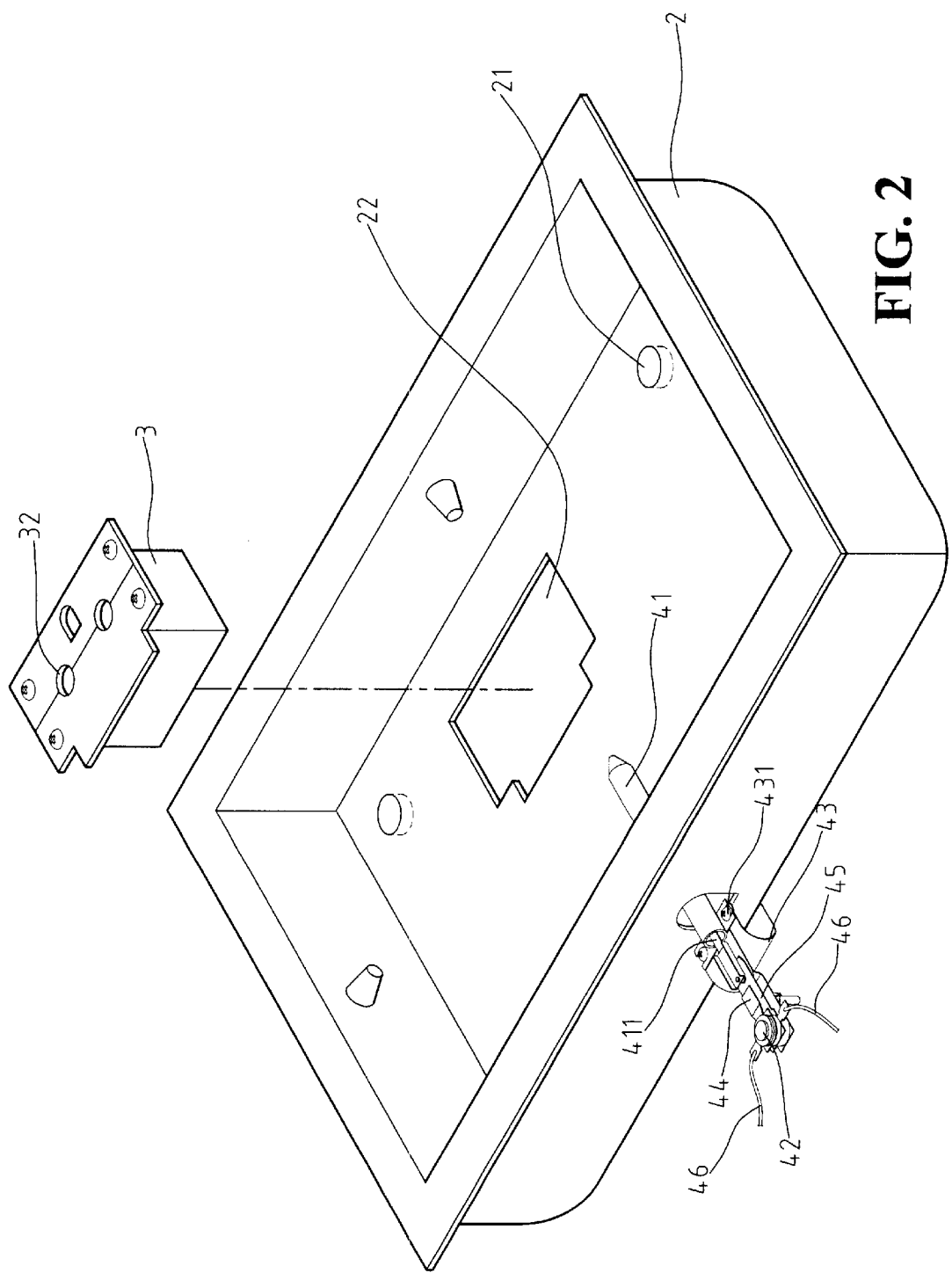
FIG. 2 is an exploded view to show a receptacle and the base of the pot assembly of the present invention.
Figure 3:
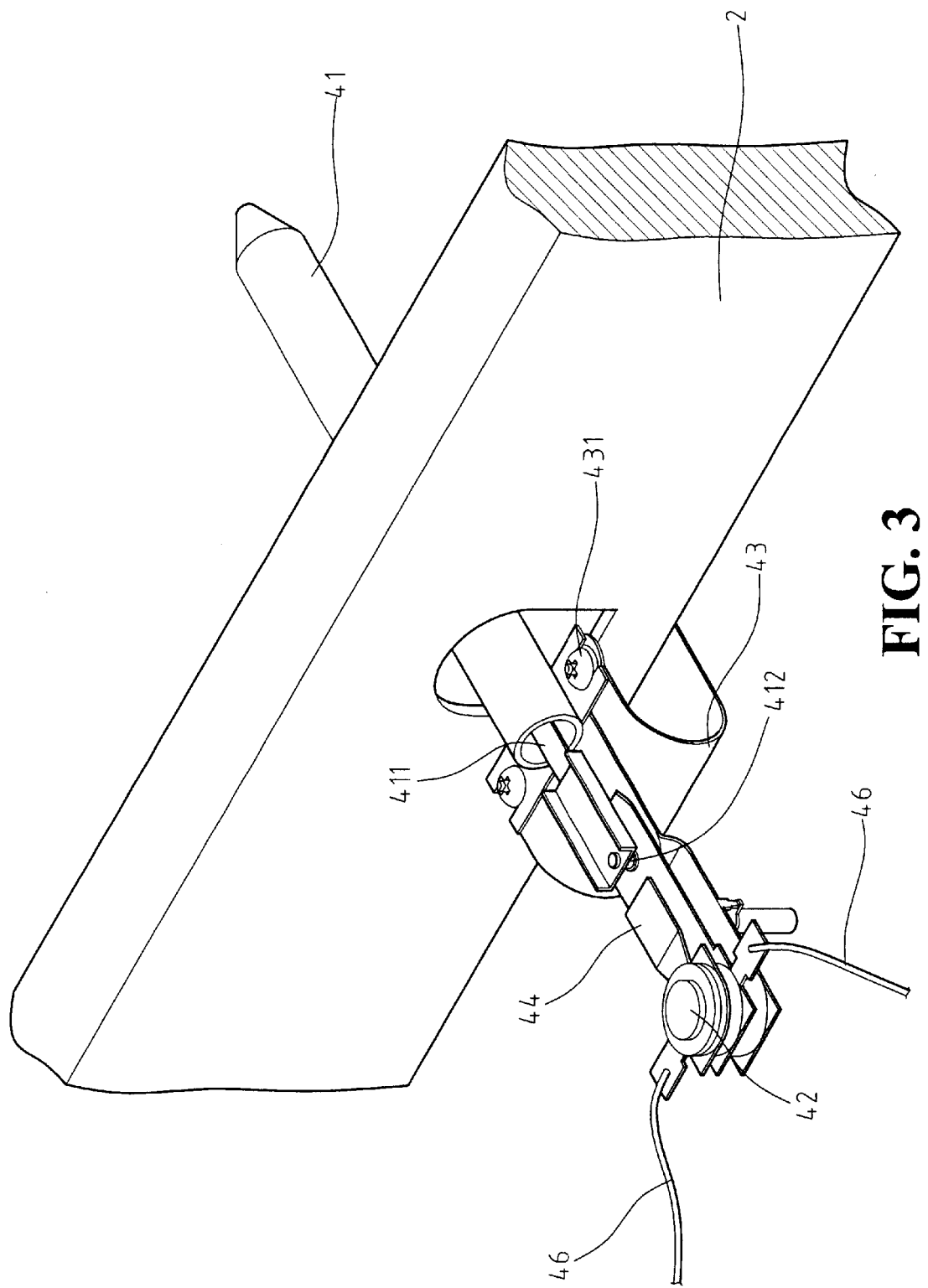
FIG. 3 is a perspective view to show the temperature probe connected to the base of the pot assembly of the present invention.
Figure 4:
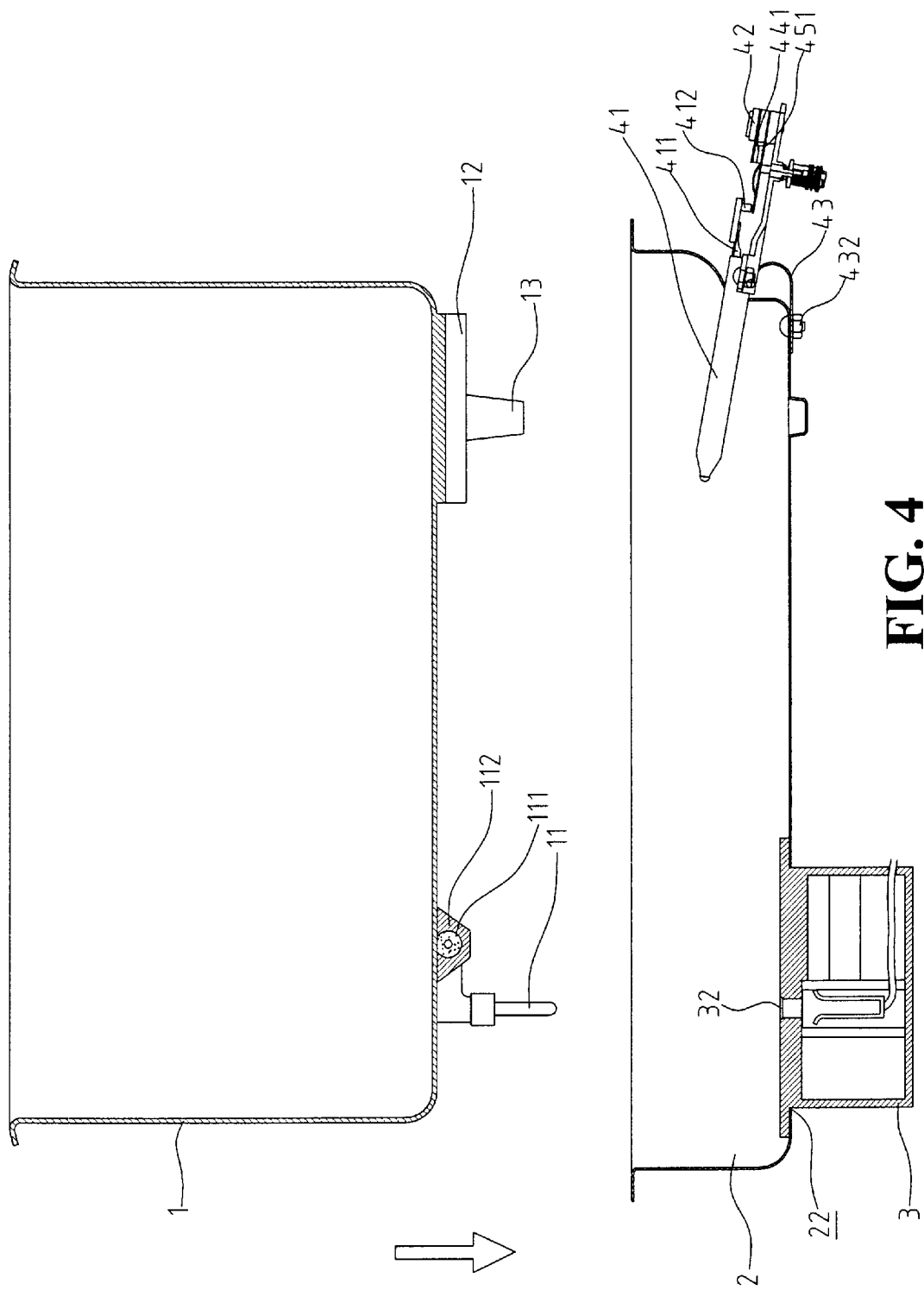
FIG. 4 is a cross sectional view to show the pot is to be put on the base of the present invention.

Referring to FIGS. 1 to 3, the pot assembly of the present invention comprises a base 2 having a peripheral wall and a receptacle 3 is engaged with a hole 22 defined through the base 2. Four apertures 21 are defined through the base 2 for receiving four position rods 13 on the bottom of the pot 1. A U-shaped resilient member 43 connected to a bottom of the base 2 by bolts 432 as shown in FIG. 4, wherein the resilient member 43 has one end thereof fixedly connected to the base 2 and the other end of the resilient member 43 is a free end.

A temperature probe 41 has an end connected to the free end of the resilient member 43 by bolts 431 and a bi-metal plate 411 is received in the probe 41. The other end of the temperature probe 41 extending through a hole defined in the peripheral wall of the base 2. A temperature sensing member 42 connected with wires 46 is connected to the temperature probe 41 and has a first plate 44 and a second plate 45. Further referring to FIG. 5, the first plate 44 is located above and contacting the second plate 45, and the first plate 44 has a contact point 441 contacting a contact point 451 on the second plate 45. An end of the bi-metal plate 411 contacts the second plate 45. The bi-metal plate 411 has an end having a contact point 412 which contacts the second plate 45. The end of the temperature probe 41 is located higher than the end where the temperature sensing member 42 is connected.

The pot 1 has an electric wire 111 and a frame 12 connected to a bottom thereof. A sheath 112 is wrapped around the wire 111. Two terminals 11 extend from two ends of the electric wire 111 so that the two terminals 11 are engaged with the holes 32 in the receptacle 3 when the pot 1 is put on the base 2. The frame 12 has a recess 121 in which the temperature probe 41 is engaged when the pot 1 is put on the base 2.

Figure 5:
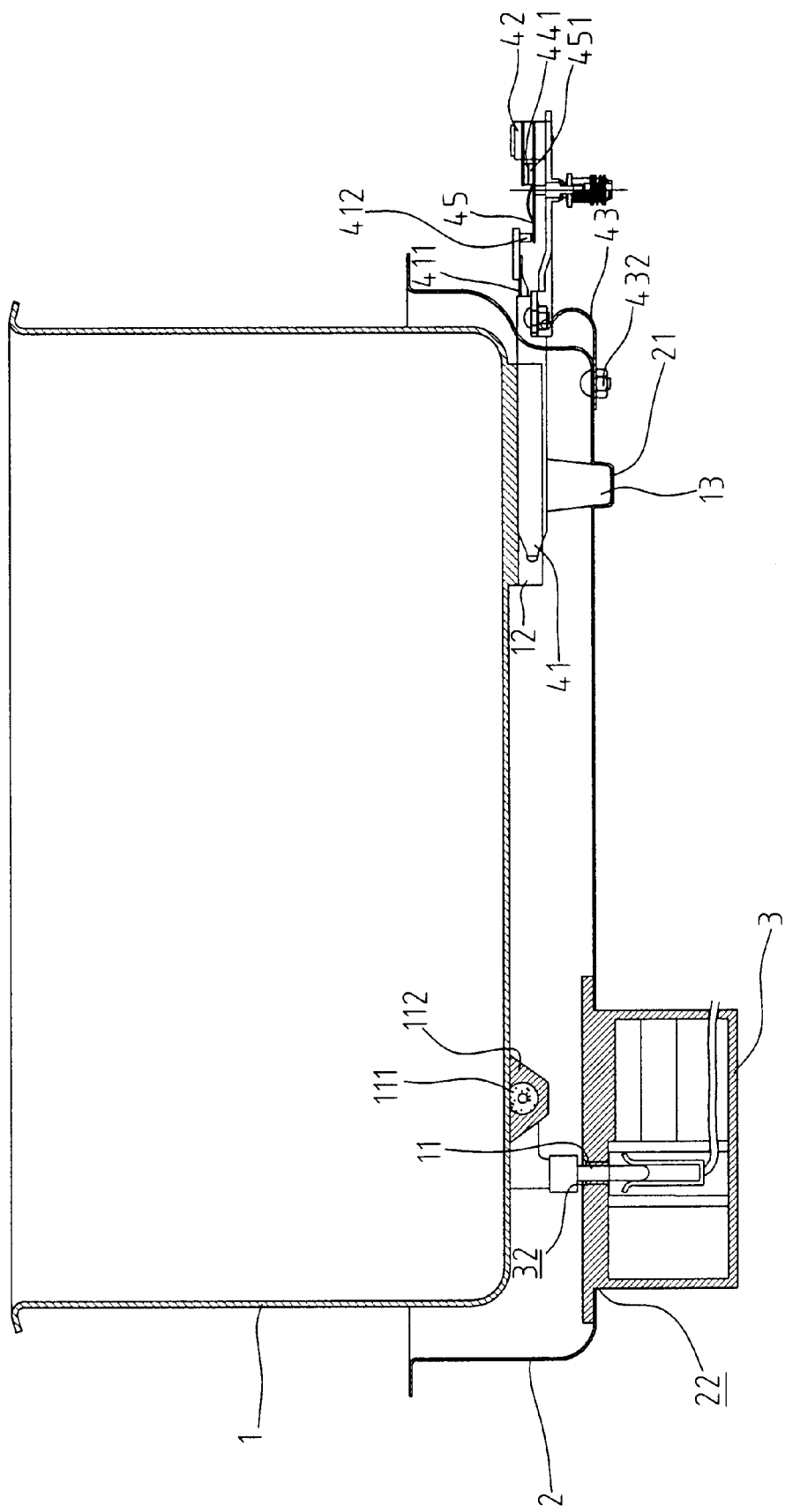
FIG. 5 is a cross sectional view to show the pot is put on the base of the present invention.

As shown in FIG. 5, when the pot 1 is put on the base 2, the four position rods 13 of the pot 1 are inserted in the apertures 21, and the probe 41 is engaged with the recess 121 in the frame 12. When the temperature reaches a pre-determined point, the bi-metal plate 411 is deformed and curves downwards to press the second plate 45 away from the first plate 44. The two contact points 441, 451 are then separated to open the circuit so that the temperature will not raise. When the temperature of the bi-metal plate 411 is lowered, it becomes straight as normal status and the two contact points 441, 451 contact with each other again, and the circuit is connected. When the pot 1 is removed from the base 2, the terminals 11 are disengaged from the holes 32 in the receptacle, the circuit is opened again.

The pot assembly of the present invention improves the inherent shortcoming of the conventional electric pot and is able to control the temperature at a pre-decided temperature.

While we have shown and described the embodiment in accordance with the present invention, it should be clear to those skilled in the art that further embodiments may be made without departing from the scope of the present invention.

What is claimed is:

1. An electric pot assembly comprising:

a base having a receptacle connected thereto and a resilient member connected to an outside of said base;

a temperature probe comprising a bi-metal plate received therein and an end of said temperature probe connected to said resilient member and the other end of said temperature probe extending through a hole defined in a peripheral wall of said base, a temperature sensing member connected to said temperature probe and having a first plate and a second plate, said first plate located above and contacting said second plate, an end of said bi-metal plate contacting said second plate, and a pot having an electric wire connected to a bottom thereof and two terminals extending from two ends of said electric wire, said two terminals engaged with said receptacle when said pot is put on said base, a frame connected to said bottom of said pot and having a recess in which said temperature probe is engaged when said pot is put on said base.

2. The assembly as claimed in claim 1, wherein said base has four apertures said pot has four position rods extending from said bottom of said pot, said positioning rods inserted in said apertures when said pot is put on said base.

3. The assembly as claimed in claim 1, wherein said resilient member is a U-shaped member and one end of said resilient member is fixedly connected to said base and the other end of said resilient member is a free end, said temperature probe is connected on said free end of said resilient member.

* * * * *